United States Patent [19]
Hepburn

[11] Patent Number: 5,727,385
[45] Date of Patent: Mar. 17, 1998

[54] LEAN-BURN NOX CATALYST/NOX TRAP SYSTEM

[75] Inventor: Jeffrey Scott Hepburn, Dearborn, Mich.

[73] Assignee: Ford Global Technologies, Inc., Dearborn, Mich.

[21] Appl. No.: 569,517

[22] Filed: Dec. 8, 1995

[51] Int. Cl.$^6$ ............................................. F01N 3/00
[52] U.S. Cl. ........................... 60/297; 60/274; 423/213.7
[58] Field of Search ............................ 60/297, 301, 274; 423/213.7

[56] References Cited

U.S. PATENT DOCUMENTS

| | | | |
|---|---|---|---|
| 5,351,792 | 10/1994 | Kotoh et al. | 60/301 |
| 5,402,641 | 4/1995 | Katoh et al. | 60/297 |
| 5,404,719 | 4/1995 | Araki et al. | |
| 5,412,945 | 5/1995 | Katoh et al. | 60/301 |
| 5,472,673 | 12/1995 | Goto et al. | 60/297 |
| 5,474,745 | 12/1995 | Fukui et al. | 60/274 |
| 5,546,921 | 8/1996 | Uchikawa | 60/274 |

FOREIGN PATENT DOCUMENTS

| | | | |
|---|---|---|---|
| 464709 | 1/1992 | European Pat. Off. | 60/297 |
| 0 560 991 A1 | 9/1993 | European Pat. Off. | |
| 4-197447 | 7/1992 | Japan | |
| 5-317652 | 12/1993 | Japan | |

*Primary Examiner*—John T. Kwon
*Attorney, Agent, or Firm*—Lorraine S. Melotik

[57] ABSTRACT

The invention is a catalyst system for purifying exhaust gases generated by a lean-burn internal combustion engine, particularly automotive engines. The catalyst system comprises two separate components located in the exhaust gas passage, the first being a lean-burn nitrogen oxide catalyst and the second being a nitrogen oxide trap material, where the lean-burn NOx catalyst is located upstream of the NOx trap material in the exhaust gas passage. Preferably the catalyst comprises a transition metal such as copper, chromium, iron, cobalt, or manganese loaded on a refractory oxide or exchanged into a zeolite. The NOx trap preferably comprises (i) at least one precious metal selected from platinum and palladium loaded on a porous support; and (ii) at least one alkali metal or alkaline earth metal (a) loaded on a porous support or (b) present as an oxide thereof. Optionally the catalyst system may further comprise a three-way catalyst located either between the two-components or after the $NO_x$ trap material.

10 Claims, 2 Drawing Sheets

LEAN-BURN NOX CATALYST/NOX TRAP SYSTEM

FIELD OF THE INVENTION

This invention relates to a catalyst system comprising a lean-burn nitrogen oxide catalyst and a nitrogen oxide trap employed in series in an exhaust gas passage of a lean-burn internal combustion engine.

BACKGROUND OF THE INVENTION

Catalysts are employed in the exhaust systems of automotive vehicles to convert carbon monoxide, hydrocarbons, and nitrogen oxides ($NO_x$) produced during engine operation into more desirable gases. When the engine is operated in a stoichiometric or slightly rich air/fuel (A/F) ratio, catalysts containing palladium, platinum, and/or rhodium are able to efficiently convert all three gases simultaneously. That is, the carbon monoxide and hydrocarbons are oxidized to carbon dioxide and water and the NOx is reduced to nitrogen. Hence, such catalysts are often called "three-way" catalysts. It is desirable, however, to operate the engine in a "lean-burn" condition where the A/F ratio is greater than the 14.4–14.7 stoichiometric range, generally between 19 and 27, to realize a benefit in fuel economy. While such precious metal three-way catalysts are able to efficiently convert carbon monoxide and hydrocarbons during lean-burn (excess oxygen) operation, they are not efficient in converting the $NO_x$ under lean-burn conditions.

A number of types of lean-burn NOx catalysts have been proposed, one category being based on ion-exchanged zeolite materials. Another proposed lean-burn NOx catalyst uses tungsten on alumina. In these lean-burn NOx catalysts, the method for catalysis is the selective reduction of NOx to $N_2$ with hydrocarbons present in the exhaust gas. Generally in exhaust systems, such lean-burn NOx catalysts would be used with a three-way or oxidation catalyst to aid in the removal of the hydrocarbons and carbon monoxide. This is because lean-burn NOx catalysts are efficient at converting NOx but fairly inefficient at converting carbon monoxide and hydrocarbons under lean-burn conditions.

Another type of catalyst for removing NOx from the exhaust gas of internal combustion engines during lean burn operation, often called a "NOx trap" or "NOx absorber", is currently receiving considerable attention. Such NOx absorbers are disclosed, e.g., in EPO Application 560991 A1 entitled "Device for Purifying Exhaust of Internal Combustion Engine" published Sep. 22, 1993 and in U.S. Pat. No. 5,404,719 issued Apr. 11, 1995. This catalyst generally comprises alkali metals or alkaline earth materials like potassium or strontium in combination with a precious metal like platinum. Under conditions of excess oxygen, i.e., when the exhaust gas is lean, this trap is capable of storing (absorbing) nitrogen oxides. When the oxygen concentration of the exhaust gas is lowered, the NOx is released from the NOx trap catalyst. These traps thus operate in a radically different way compared to conventional lean-burn catalysts. More particularly, the widely held mechanism for NOx trap operation is that the precious metal first oxidizes NO to $NO_2$ and the $NO_2$ subsequently forms a nitrate complex with the alkali(ne) material. In a stoichiometric or rich environment, the nitrate is thermodynamically unstable, and the stored NOx is released. $NO_x$ then catalytically reacts with excess reducing species in the exhaust gas to form $N_2$.

While conventional lean-NOx catalysts and NOx trap materials have the ability to remove nitrogen oxides during lean-burn operation, they are still often less efficient than would be desired. We have found that we can take advantage of the radical differences in the mechanisms of operation between the NOx catalyst and the NOx trap. That is, we have found that by employing a lean-burn NOx catalyst together with a NOx trap material in an exhaust gas passage such that the lean-burn NOx catalyst is upstream of the NOx trap, the conversion of nitrogen oxides during lean-burn operation is significantly improved.

DISCLOSURE OF THE INVENTION

This invention is directed to a two-component catalyst system, located in the exhaust gas passage of a lean-burn internal combustion engine, useful for converting carbon monoxide, nitrogen oxides, and hydrocarbons present in the exhaust gas, the catalyst system comprises the following two components:

(1) lean-burn nitrogen oxide (NOx) catalyst; and (2) a nitrogen oxide trap material which absorbs NOx when the exhaust gas flowing into said trap material is lean and releases the absorbed NOx when the concentration of oxygen in the inflowing exhaust gas is lowered. The nitrogen oxide trap material is located downstream of the lean-burn nitrogen oxide catalyst in the exhaust gas passage such that the exhaust gases are exposed to the lean-burn catalyst prior to being exposed to the nitrogen oxide trap material.

The first component (the lean-burn NOx catalyst) preferably comprises a transition metal such as copper, chromium, iron, cobalt, nickel, iridium, cadmium, silver, gold, platinum, or manganese loaded on a refractory oxide or exchanged into zeolite. The second component (the NOx trap) preferably comprises (a) at least one precious metal selected from platinum and palladium loaded on a porous support; and (b) at least one alkali metal or alkaline earth metal (i) loaded on a porous support or (ii) present as an oxide thereof). The present invention system requires the lean-burn NOx catalyst to be positioned upstream of the NOx trap in the exhaust gas passage. Optionally the catalyst system may further comprise a three-way catalyst located either between the two-components or after the second component, the $NO_x$ trap, in the exhaust gas passage.

In another aspect, the invention is an internal combustion engine exhaust gas catalyst system comprising the two-component catalyst system disclosed above.

DESCRIPTION OF PREFERRED EMBODIMENTS

Figure 1:
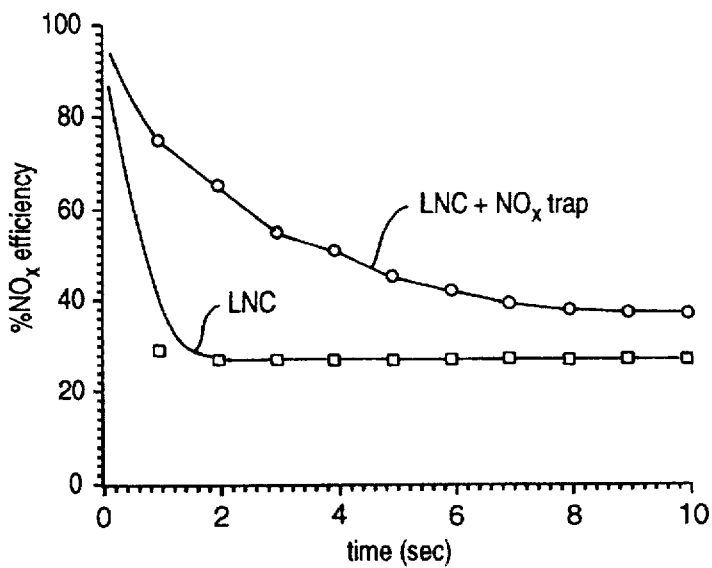
FIG. 1 is a graph which nitrogen oxide conversion efficiency for a Cu-ZSM5 (lean-burn) catalyst with the same Cu-ZSM5 catalyst in series with a potassium/platinum NOx trap materials.

This invention, according to one aspect, is directed to a catalyst system which comprises two components. These components are located in the exhaust gas passage of a lean-burn internal combustion engine. This catalyst system is useful for converting the carbon monoxide, hydrocarbons and NOx present in the generated the exhaust gas. By "lean-burn engine" herein is meant an engine which is operated in the lean-burn mode (i.e., where the A/F ratio is greater than the stoichiometric A/F ratio) most of the time. More particularly the present invention catalyst system would optimally be used with an engine whose A/F ratio would be lean except during periods of idle and high engine load.

One of the catalyst system components is a lean-burn nitrogen oxide (NOx) catalyst. The particular lean-burn NOx catalyst employed in the invention is not critical. Suitable lean-burn catalysts are those which selectively reduce nitrogen oxides to $N_2$ under lean-burn conditions, i.e., generally when the A/F ratio of the gas is greater than the 14.4–14.7 A/F (depending on the fuel) ratio associated with stoichiometric operation. Numerous such catalysts are known to those skilled in the art and are generally readily commercially available. Preferably the lean-burn NOx catalyst comprises a transition metal such as copper, chromium, iron, cobalt, nickel, cadmium, silver, gold, iridium, platinum and manganese, or mixtures of any of them loaded on a refractory oxide or exchanged into a zeolite. Preferably these zeolites have Si:Al ratios greater than about 20. One particularly preferred zeolite is ZSM5. Exemplary of refractory oxides are alumina, zirconia, silica alumina and titania.

When the lean-burn NOx catalyst comprises transition metals loaded on a refractory oxide, the metal is optimally loaded in an amount of 0.1–10 weight percent based on the weight of the refractory oxide. The loading employed depends in great part on the particular metal(s) employed. For example, platinum would be used in a lower loading than copper as would be appreciated by those skilled in the art in view of the present disclosure. One suitable technique for loading the metal on the oxide is by incipient wetness, a technique well known to those skilled in the art. Any technique, however, may be employed. When the lean-burn NOx catalyst comprises a lo transition metal ion exchanged into the zeolite, it is optimally provided in an amount of 20–200% based on the cation content of the zeolite.

For useful application in an exhaust passage, the first component is carried on a substrate of a high temperature stable, electrically insulating material. Typical of such substrate materials are cordierite, mullite, etc. The substrate may be in any suitable configuration, often being employed as a monolithic honeycomb structure, spun fibers, corrugated foils or layered materials. Still other materials and configurations useful in this invention and suitable in an exhaust gas passage will be apparent to those skilled in the art in view of the present disclosure. To provide the lean NOx catalyst onto the substrate, generally the catalyst material, e.g., metal on oxide, is ball milled and mixed with water to produce an aqueous slurry and is applied to the substrate such as a monolith and then dried and calcined.

The second component of the present invention catalyst system is a NOx trap catalyst material. This is one which stores nitrogen oxides during lean-burn operation and then releases them during stoichiometric operation. Such trap materials are preferably selected from those disclosed above and generally include precious metals like platinum and alkali metal or alkaline earth metals like potassium or strontium. The $NO_x$ trap of the present invention preferably comprises (i) at least one precious metal selected from platinum and palladium loaded on a porous support, and (ii) at least one alkali metal or alkaline earth metal either (a) loaded on a porous support or (b) present as a bulk unsupported oxide thereof. That is, for example platinum may be used alone or in admixture with palladium. Exemplary of alkali metals are potassium, sodium, lithium, and cesium. Exemplary of alkaline earth metals are calcium, barium, and strontium.

Suitable porous support materials include those materials suitable for use in the high temperature environment of exhaust gas passages and comprise high surface area materials like alumina, one preferred material being gamma-alumina. Still other support (washcoat) materials which may be used at the high operation temperatures associated with an internal combustion engine exhaust system include, but are not limited to, zeolite, zirconia, alpha alumina, cerium oxide (ceria), and magnesium oxide. Such washcoat materials, useful for carrying catalyst materials, are well known to those skilled in the art. The choice of the particular porous support (washcoat) material is not critical to this invention. Desirably, the support material has a surface area between about 10 and $300M^2$/gram.

In the present invention NOx trap and as disclosed in U.S. application Ser. No. 08/531,512 filed Sep. 12, 1995, entitled "NOx Trap With Improved Performance" and commonly assigned with this invention, the precious metal and the alkali metal elements or alkaline earth metal elements optimally are loaded on different porous supports. This avoids deleterious chemical interactions which may take place between the metals. For example, platinum may chemically interact with the alkali metal to "tie-up" the platinum and hence reduce the efficiency of the trap catalyst. In forming the NOx trap, a loading of about 0.2 to 5 weight percent precious metal catalyst, preferably between about 0.5 and 2 percent is employed, based on the weight of the support on which it is loaded. A loading of about 2 to 30 weight percent catalyst selected from alkali metal and alkaline earth metals, preferably between about 5 and 15 percent such materials, is employed, based on the weight of the support on which these materials are loaded. The precious and other metals may, however, be loaded on the same support material.

Alternately, the alkali metal or alkaline earth metal may be present as its oxide, in bulk form. That is, it may be used instead of the alkali or alkaline earth metal carried on a porous support. For example, strontium oxide may be used rather than strontium carried on alumina. In that situation, the strontium oxide may be ball milled and mixed with platinum, which is supported on alumina, to form a slurry. This slurry may then be washcoated onto a monolithic carrier to form the NOx trap. Using the bulk oxide is (less desired) because it provides a lower surface area but may provide for lower manufacturing costs.

Use of this second component would also generally require that it be carried on a substrate of a high temperature stable, electrically insulating material as described above for the first component. One way to provide the NOx trap material onto the substrate is as follows. First the porous support material is impregnated with a solution of precursor compounds which include the catalyst by incipient wetness techniques. The solution can be water or organic solvent based. For example, to load platinum onto gamma-alumina, the alumina may be impregnated with an aqueous solution of hexachloplatinic acid. After impregnation, the material is dried and calcined. It may also be desirable to incorporate some rhodium onto the platinum containing phase. Preferably the rhodium concentration would be between ⅕ and ⅒ of the platinum loading.

If the porous support is other than ceria, e.g., gamma-alumina, it may be desirable to also incorporate via impregnation some ceria into the platinum containing phase. The ceria loading on the porous support would desirably range from 2 to 20 weight % based on the weight of the support. Preferably, the ceria would be loaded onto the support material and fixed prior to impregnating the platinum precursor. The alkali metal or alkaline earth metal could be similarly loaded onto the porous support. The metal loaded support material could then be washcoated onto the substrate, e.g., the monolith. Alternately, the porous support could be washcoated first onto the substrate and then, after drying and calcination, be impregnated with the desired metals, e.g., platinum and strontium. Strontium may be provided on a porous support, e.g., from strontium nitrate.

Figure 2:
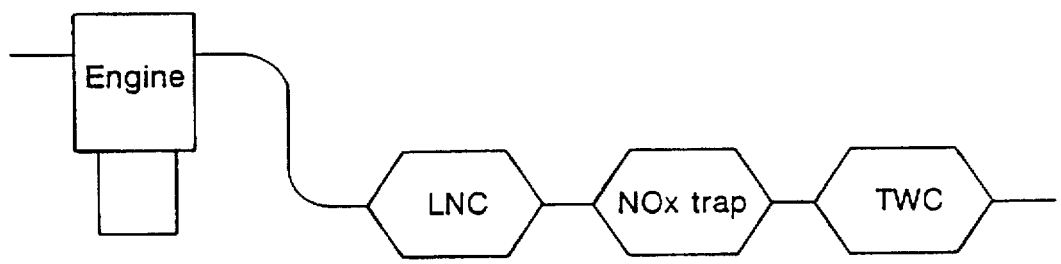
FIG. 2 schematically depicts an embodiment of the present invention catalyst system which employs a three-way catalyst.

The internal combustion engine catalyst system of this invention may include, in addition to the nitrogen oxide trap, another catalyst device such as a three-way catalyst (as shown in FIG. 2) containing, for example, palladium, platinum and rhodium, or palladium and rhodium. The three-way catalyst devices are well known by those skilled in the art. According to one embodiment of the present invention, the three-way catalyst (TWC) can be placed between the lean-burn NOx catalyst (LNC) and the $NO_x$ trap (LNT), or after the NOx trap, i.e., downstream of the NOx trap as shown in FIG. 2. In such latter an arrangement, the three-way catalyst would oxidize any unreacted HC and CO which pass through the LNC+LNT and provide for NOx conversion during periods of stoichiometric engine operation and during purging of the NOx trap.

The trap is arranged in the exhaust gas passage and absorbs NOx when the air/fuel ratio of the exhaust gas flowing into the trap is lean and releases the absorbed NOx when the oxygen concentration in the inflowing exhaust gas is lowered, as during stoichiometric operation of the engine. During periods of stoichiometric engine operation, when NOx passes through the lean-burn NOx catalyst, NOx is stored on the trap material. The NOx trap material is periodically regenerated by relatively shore periods or intervals of rich engine operation. Since the NOx trap material is positioned downstream of the lean-burn NOx catalyst, it is more remote in location relative the engine and hence it is protected against the very high exhaust gas temperatures which might damage the trap. The optional three-way catalyst downstream of the NOx trap material provides for efficient reduction of the NOx which desorbs from the trap during regeneration. If rhodium and ceria are incorporated into the platinum containing phase of the trap washcoat as disclosed above, this NOx trap may desirably be used without a three-way catalyst. In this case, the platinum/rhodium/ceria containing phase of the $NO_x$ trap provides the three-way catalyst function and hence $NO_x$ control under stoichiometric engine operation.

Figure 5:
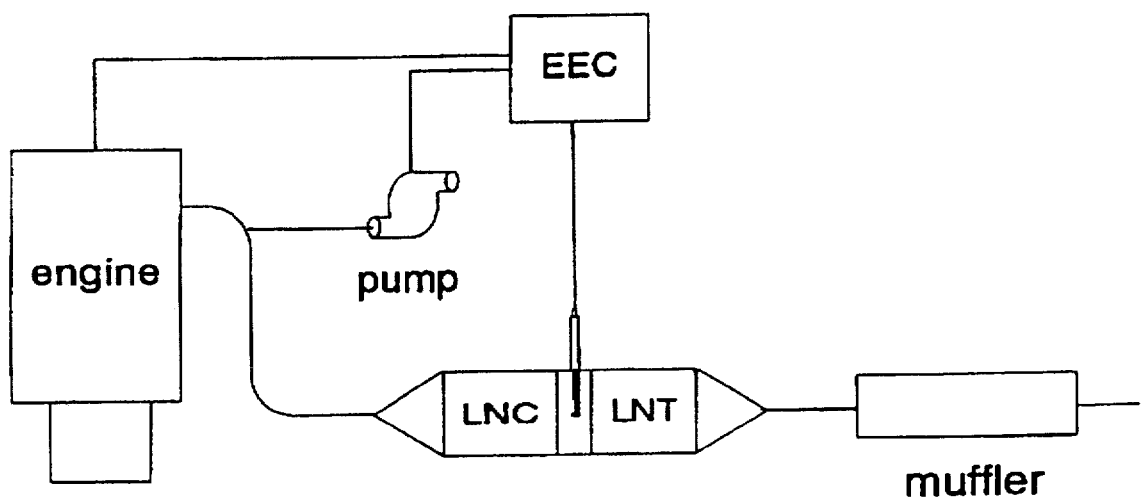
FIG. 5 schematically depicts an embodiment of the present invention which includes emission control technology.

In still another embodiment of the present invention, the use of a lean-burn $NO_x$ catalyst followed by a $NO_x$ trap material is integrated into an EGI (exhaust gas ignition) system. EGI is a cold start emission control technology wherein the engine is operated in a fuel rich condition (A/F-8:1 to 11:1) in order to produce a hydrogen rich exhaust gas composition. Using this strategy, an air pump provides air into the exhaust manifold while a glow plug which is disposed between two catalyst bricks is used to ignite the hydrogen rich exhaust gas mixture. The corresponding energy release heats up the rear catalyst brick. After light-off of the rear brick is achieved, normal engine operation is resumed. In this system, the front brick simply serves as a flame arrester or stabilizer which stops the flame from propagating upstream towards the engine. The present invention therefore additionally teaches, as another embodiment, an EGI system wherein the front brick is a lean $NO_x$ catalyst and the rear brick is a $NO_x$ trap material(see FIG. 5). This system will not only provide the benefits for lean-burn $NO_x$ control which have been described earlier but could be used to overcome the cold start emission control problems which are generally associated with the use of a lean $NO_x$ catalyst as the first brick disposed in the exhaust. Lean $NO_x$ catalysts usually display poor light-off performance relative to a conventional TWC and have an optimal operating temperature range that suggests usage in an under floor location which further exacerbates the cold start emission control issue. Commonly disclosed lean NOx catalysts are disclosed as being susceptible to poisoning by sulfur and hence sulfur traps have been suggested for use ahead of the NOx trapping material in the exhaust passage. One way to regenerate these sulfur traps and desorb the sulfur is to subject the sulfur trap material to elevated temperatures. Another advantage of the embodiment of the present invention disclosed in this section it that the EGI could be used to periodically raise the temperature of $NO_x$ trap material above the temperature which is required for sulfur regeneration.

EXAMPLES

The following Cu-ZSM5 lean-burn NOx catalyst according to an embodiment of the present invention was prepared as follows. A high silica zeolite (Si:Al=30) was obtained from a commercial source as H-ZSM5 and ion exchanged with a copper nitrate solution. The copper nitrate concentration was adjusted so as to yield a 100% cation exchange. The copper exchanged zeolite was then dried at 120° C. and calcined at 500° C. The resulting Cu-ZSM5 powder material was ball milled and then mixed with distilled water to produce a slurry. The slurry was applied to a corderite monolith (400 cell/in2) to obtain a 20 wt. % loading of the copper exchanged zeolite. The monolith was subsequently dried at 120° C. for 4 hours followed by calcination in air at 500° C. for 4 hours.

A potassium/platinum NOx trap material, according to one embodiment of the invention, was prepared as follows. Gamma-alumina powder (100 m$^2$/g) was ball milled and mixed with distilled water to produce a slurry of the material. The slurry was then applied to a corderite monolith (400 cell/in$^2$ ) in order to obtain a 25 wt % loading of the alumina. The coated monolith was subsequently dried at 120° C. and calcined at 500° C. The resulting alumina coated substrate was impregnated with an aqueous solution containing chloroplatinic acid and potassium nitrate. The platinum and potassium solution concentrations were adjusted so as to provide for a final loading of 0.5 wt % platinum and 10 wt. % potassium on the monolith. Following impregnation, the monolith was dried and then calcined in air at 500° C. for 4 hours.

For testing of the example catalysts, they were exposed to a simulated exhaust gas consisting of 10% $H_2O$, 10% $CO_2$, 6% $O_2$, 0.1% CO, 0.03% $H_2$, 50 ppm C3 H6, and 1000 ppm $NO_x$. The inlet gas temperature was 300 C. and the space velocity through the NOx trap was 30,000 hr-1. The results are shown in FIGS. 1, 3 and 4.

FIG. 1 is a graph which compares NOx conversion efficiency for the Cu-ZSM5 prepared above (by itself as a comparative example); with the same Cu-ZSM5 in series with the potassium/platinum NOx trap prepared above. This latter two component catalyst system is according to an embodiment of the present invention. By placing the NOx trap downstream of the lean NOx catalyst, NOx removal from the combustion exhaust during a 10 minute lean-burn period of operation is nearly doubled. Since the NOx trap contains platinum, which readily oxidized hydrocarbons, the lean-burn NOx catalyst needs to be positioned upstream of the NOx trap as shown in FIG. 2.

Figure 3:
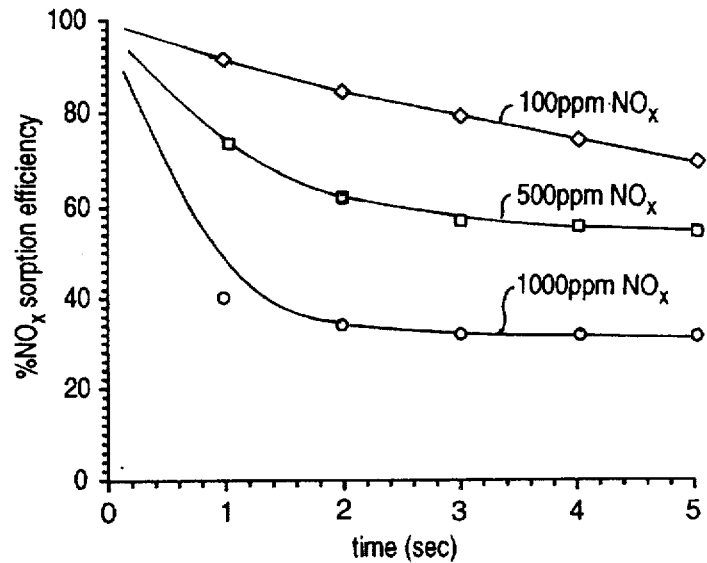
FIG. 3 is a graph which shows NOx trap efficiency as a function of NOx inlet concentration.
Figure 4:
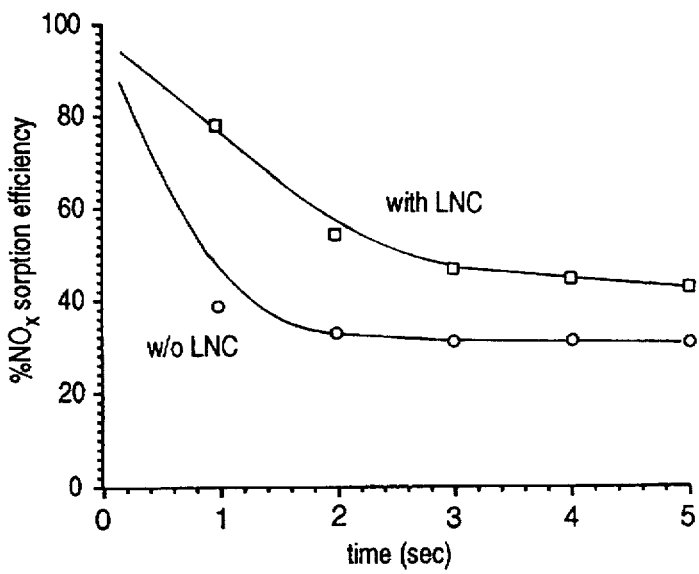
FIG. 4 is a graph which shows nitrogen oxide trapping efficiency as a function of NOx inlet concentration.

FIG. 3 shows that the NOx trap material sorption efficiency is a function of $NO_x$ inlet concentration. It can be seen that $NO_x$ trap efficiency increases as the $NO_x$ concentration in the inflowing exhaust gas decreases. In the present invention, the $NO_x$ present in exhaust gas produced by the engine is partially converted by the (first component) lean burn $NO_x$ catalyst. Therefore, the nitrogen oxide concentration entering the (second component) NOx trap material is lowered, thereby providing for higher $NO_x$ sorption efficiency over the trap as shown in FIG. 4. As a result, there exists an unexpected synergy of the lean $NO_x$ catalyst and the $NO_x$ trap material when used together in the exhaust gas passage as in the present invention.

We claim:

1. A catalyst system, located in the exhaust gas passage of a lean-burn internal combustion engine, useful for converting carbon monoxide, nitrogen oxides, and hydrocarbons present in the exhaust gas, said catalyst system comprising two-components:

(1) lean-burn nitrogen oxide catalyst being a transition metal selected from the group consisting of copper, chromium, iron, cobalt, nickel, iridium, cadmium, silver, gold, platinum, manganese, and mixtures thereof (i) loaded on a refractory oxide or (ii) exchanged into zeolite, wherein said transition metal is loaded on said refractory oxide in an amount of about 0.1 to 10 weight percent based on the weight of said refractory oxide; and (2) a nitrogen oxide (NOx) trap material which absorbs NOx when the exhaust gas flowing into said trap material is lean and releases the absorbed NOx when the concentration of oxygen in the inflowing exhaust gas is lowered;

said nitrogen oxide trap material being located downstream of said lean-burn nitrogen oxide catalyst in said exhaust gas passage such that said exhaust gases are exposed to said lean-burn catalyst prior to being exposed to said nitrogen oxide tram material.

2. A catalyst system, located in the exhaust gas passage of a lean-burn internal combustion engine, useful for converting carbon monoxide, nitrogen oxides, and hydrocarbons present in the exhaust gas, said catalyst system comprising two-components:

(1) lean-burn nitrogen oxide catalyst being a transition metal selected from the group consisting of copper, chromium, iron, cobalt, nickel, iridium, cadmium, silver, gold, platinum, manganese, and mixtures thereof (i) loaded on a refractory oxide or (ii) exchanged into zeolite, wherein said transition metal exchanged zeolite comprises 20 to 200% based upon the cation content of the zeolite; and (2) a nitrogen oxide (NOx) trap material which absorbs NOx when the exhaust gas flowing into said trap material is lean and releases the absorbed NOx when the concentration of oxygen in the inflowing exhaust gas is lowered;

said nitrogen oxide trap material being located downstream of said lean-burn nitrogen oxide catalyst in said exhaust gas passage such that said exhaust gases are exposed to said lean-burn catalyst prior to being exposed to said nitrogen oxide trap material.

3. A catalyst system, located in the exhaust gas passage of a lean-burn internal combustion engine, useful for converting carbon monoxide, nitrogen oxides, and hydrocarbons present in the exhaust gas, said catalyst system comprising two-components:

(1) lean-burn nitrogen oxide catalyst; and (2) a nitrogen oxide (NOx) trap material which absorbs NOx when the exhaust gas flowing into said trap material is lean and releases the absorbed NOx when the concentration of oxygen in the inflowing exhaust gas is lowered; wherein said nitrogen oxide trap material comprises (i) at least one precious metal selected from the group consisting of platinum and palladium loaded on a porous support; and (ii) at least one alkali metal or alkaline earth metal either (a) loaded on a porous support or (b) present as a bulk oxide thereof, wherein said least one alkali metal or alkaline earth metal is present in an amount of about 2 to 30 weight percent on said porous support;

said nitrogen oxide trap material being located downstream of said lean-burn nitrogen oxide catalyst in said exhaust gas passage such that said exhaust gases are exposed to said lean-burn catalyst prior to being exposed to said nitrogen oxide trap material.

4. A catalyst system, located in the exhaust gas passage of a lean-burn internal combustion engine, useful for converting carbon monoxide, nitrogen oxides, and hydrocarbons present in the exhaust gas, said catalyst system comprising two-components:

(1) lean-burn nitrogen oxide catalyst being a transition metal selected from the group consisting of copper, chromium, iron, cobalt, nickel, iridium, cadmium, silver, gold, platinum, manganese, and mixtures thereof (i) loaded on a refractory oxide or (ii) exchanged into zeolite, wherein said refractory oxide comprises alumina; and (2) a nitrogen oxide (NOx) trap material which absorbs NOx when the exhaust Gas flowing into said trap material is lean and releases the absorbed NOx when the concentration of oxygen in the inflowing exhaust Gas is lowered;

said nitrogen oxide tram material being located downstream of said lean-burn nitrogen oxide catalyst in said exhaust gas passage such that said exhaust gases are exposed to said lean-burn catalyst prior to being exposed to said nitrogen oxide trap material.

5. A catalyst system, located in the exhaust gas passage of a lean-burn internal combustion engine, useful for converting carbon monoxide, nitrogen oxides, and hydrocarbons present in the exhaust gas, said catalyst system comprising two-components:

(1) lean-burn nitrogen oxide catalyst; and (2) a nitrogen oxide (NOx) trap material which absorbs NOx when the exhaust gas flowing into said tram material is lean and releases the absorbed NOx when the concentration of oxygen in the inflowing exhaust gas is lowered; wherein said nitrogen oxide tram material comprises (i) at least one precious metal selected from the group consisting of platinum and palladium loaded on a porous support; and (ii) at least one alkali metal or alkaline earth metal either (a) loaded on a porous support or (b) present as a bulk oxide thereof, wherein said porous support is selected from alumina, zirconia, titania, or silica;

said nitrogen oxide tram material being located downstream of said lean-burn nitrogen oxide catalyst in said exhaust gas passage such that said exhaust gases are exposed to said lean-burn catalyst prior to being exposed to said nitrogen oxide trap material.

6. A method for conversion of nitrogen oxides, carbon monoxide and hydrocarbons present in exhaust gases produced by an internal combustion engine operated under lean-burn conditions, which comprises the steps of:

exposing said exhaust gases to a catalyst system comprising:

(1) a lean-burn nitrogen oxide catalyst being a transition metal selected from the group consisting of copper, chromium, iron, cobalt, nickel, iridium, cadmium, silver, gold, platinum, manganese, and mixtures thereof (i) loaded on a refractory oxide or (ii) exchanged into zeolite, wherein said transition metal is loaded on said refractory oxide in an amount of about 0.1 to 10 weight percent based on the weight of said refractory oxide; and (2) a nitrogen oxide (NOx) trap material which absorbs NOx when the exhaust gas flowing into said trap material is lean and releases the absorbed NOx when the concentration of oxygen in the inflowing exhaust gas is lowered;

such that said exhaust gases are exposed to said lean-burn catalyst prior to being exposed to said nitrogen oxide trap.

7. A method for conversion of nitrogen oxides, carbon monoxide and hydrocarbons present in exhaust gases produced by an internal combustion engine operated under lean-burn conditions, which comprises the steps of:

exposing said exhaust gases to a catalyst system comprising:

(1) lean-burn nitrogen oxide catalyst being a transition metal selected from the group consisting of copper, chromium, iron, cobalt, nickel, iridium, cadmium, silver, gold, platinum, manganese, and mixtures thereof (i) loaded on a refractory oxide or (ii) exchanged into zeolite, wherein said transition metal exchanged zeolite comprises 20 to 200% based upon the cation content of the zeolite; and (2) a nitrogen oxide (NOx) trap material which absorbs NOx when the exhaust gas flowing into said tram material is lean and releases the absorbed NOx when the concentration of oxygen in the inflowing exhaust gas is lowered;

said nitrogen oxide trap material being located downstream of said lean-burn nitrogen oxide catalyst in said exhaust gas passage such that said exhaust gases are exposed to said lean-burn catalyst prior to being exposed to said nitrogen oxide trap material.

8. A method for conversion of nitrogen oxides, carbon monoxide and hydrocarbons present in exhaust gases produced by an internal combustion engine operated under lean-burn conditions, which comprises the steps of:

exposing said exhaust gases to a catalyst system comprising:

(1) lean-burn nitrogen oxide catalyst; and (2) a nitrogen oxide (NOx) trap material which absorbs NOx when the exhaust gas flowing into said trap material is lean and releases the absorbed NOx when the concentration of oxygen in the inflowing exhaust gas is lowered, wherein said nitrogen oxide trap material comprises (i) at least one precious metal selected from the group consisting of platinum and palladium loaded on a porous support; and (ii) at least one alkali metal or alkaline earth metal either (a) loaded on a porous support or (b) present as a bulk oxide thereof, wherein said least one alkali metal or alkaline earth metal is present in an amount of about 2 to 30 weight percent on said porous support;

said nitrogen oxide trap material being located downstream of said lean-burn nitrogen oxide catalyst in said exhaust gas passage such that said exhaust gases are exposed to said lean-burn catalyst prior to being exposed to said nitrogen oxide trap material.

9. A method for conversion of nitrogen oxides, carbon monoxide and hydrocarbons present in exhaust gases produced by an internal combustion engine operated under lean-burn conditions, which comprises the steps of:

exposing said exhaust gases to a catalyst system comprising:

(1) lean-burn nitrogen oxide catalyst being a transition metal selected from the group consisting of copper, chromium, iron, cobalt, nickel, iridium, cadmium, silver, gold, platinum, manganese, and mixtures thereof (i) loaded on a refractory oxide or (ii) exchanged into zeolite, wherein said refractory oxide comprises alumina; and (2) a nitrogen oxide (NOx) trap material which absorbs NOx when the exhaust gas flowing into said trap material is lean and releases the absorbed NOx when the concentration of oxygen in the inflowing exhaust gas is lowered;

said nitrogen oxide trap material being located downstream of said lean-burn nitrogen oxide catalyst in said exhaust gas passage such that said exhaust gases are exposed to said lean-burn catalyst prior to being exposed to said nitrogen oxide trap material.

10. A method for conversion of nitrogen oxides, carbon monoxide and hydrocarbons present in exhaust gases produced by an internal combustion engine operated under lean-burn conditions, which comprises the steps of:

exposing said exhaust gases to a catalyst system comprising:

(1) lean-burn nitrogen oxide catalyst; and (2) a nitrogen oxide (NOx) trap material which absorbs NOx when the exhaust gas flowing into said trap material is lean and releases the absorbed NOx when the concentration of oxygen in the inflowing exhaust gas is lowered, wherein said nitrogen oxide trap material comprises (i) at least one precious metal selected from the group consisting of platinum and palladium loaded on a porous support; and (ii) at least one alkali metal or alkaline earth metal either (a) loaded on a porous support or (b) present as a bulk oxide thereof, wherein said porous support is selected from alumina, zirconia, titania, or silica;

said nitrogen oxide trap material being located downstream of said lean-burn nitrogen oxide catalyst in said exhaust gas passage such that said exhaust gases are exposed to said lean-burn catalyst prior to being exposed to said nitrogen oxide trap material.

* * * * *